United States Patent
Attard et al.

(10) Patent No.: US 10,399,869 B2
(45) Date of Patent: Sep. 3, 2019

(54) CONTAMINANT RECOVERY DEVICE

(71) Applicant: FM ENVIRONMENTAL LIMITED, Newry (GB)

(72) Inventors: Christian Attard, Newry (GB); Cormac Fitzpatrick, Newry (GB); Mario Farrugia, Newry (GB)

(73) Assignee: FM Environmental Limited, Newry (GB)

( * ) Notice: Subject to any disclaimer, the term of this patent is extended or adjusted under 35 U.S.C. 154(b) by 0 days.

(21) Appl. No.: 15/639,140

(22) Filed: Jun. 30, 2017

(65) Prior Publication Data
US 2018/0002196 A1    Jan. 4, 2018

(30) Foreign Application Priority Data

Jun. 30, 2016  (GB) .................................. 1611364.9

(51) Int. Cl.
| | |
|---|---|
| *C02F 1/40* | (2006.01) |
| *B01D 17/032* | (2006.01) |
| *E03F 5/16* | (2006.01) |
| *B01D 17/02* | (2006.01) |
| *B01D 17/00* | (2006.01) |
| *B01D 17/12* | (2006.01) |
| *C02F 101/32* | (2006.01) |

(52) U.S. Cl.
CPC ................ *C02F 1/40* (2013.01); *B01D 17/02* (2013.01); *B01D 17/0214* (2013.01); *B01D 17/10* (2013.01); *B01D 17/12* (2013.01); *E03F 5/16* (2013.01); *C02F 2101/32* (2013.01)

(58) Field of Classification Search
CPC .... C02F 1/40; C02F 2101/32; B01D 17/0214; E03F 5/16; E02B 15/102; E02B 15/103
USPC .......... 210/776, 242.3, 242.4, 523, 524, 540
See application file for complete search history.

(56) References Cited

U.S. PATENT DOCUMENTS

| | | | | |
|---|---|---|---|---|
| 655,045 | A * | 7/1900 | Bender .............. | B01D 35/0276 210/523 |
| 3,219,189 | A * | 11/1965 | Moore ..................... | B03D 1/02 210/540 |
| 3,447,683 | A * | 6/1969 | Luce, Jr. ............ | B01D 21/2438 210/776 |
| 5,089,118 | A * | 2/1992 | Mahoney .............. | E02B 15/108 210/523 |

(Continued)

FOREIGN PATENT DOCUMENTS

| | | |
|---|---|---|
| CN | 202609984 | 12/2012 |
| GB | 2497334 | 1/2012 |

(Continued)

OTHER PUBLICATIONS

Machine Translation of CN202609984.

*Primary Examiner* — Christopher Upton
(74) *Attorney, Agent, or Firm* — Preston Smirman; Smirman IP Law, PLLC

(57) ABSTRACT

A contaminant recovery device comprising a container sized to hold a body of contaminated liquid. A skimming arrangement adaptable to at least temporarily remove contaminants from the body of contaminated liquid and an assembly for inducing a flow in at least part of the body of contaminated liquid at or about the skimming arrangement. The skimming arrangement is adaptable to at least temporarily remove contaminants from around the surface of the body of contaminated liquid.

20 Claims, 1 Drawing Sheet

(56) References Cited

U.S. PATENT DOCUMENTS

| | | | |
|---|---|---|---|
| 5,122,280 A * | 6/1992 | Russell | B01D 17/0214 210/540 |
| 5,167,815 A | 12/1992 | Bachmann et al. | |
| 5,223,128 A * | 6/1993 | Combrowski | B01D 17/0214 210/242.4 |
| 5,378,371 A * | 1/1995 | Hobson | B01D 17/0214 210/242.4 |
| 5,827,425 A | 10/1998 | McKinnon | |
| 2018/0002195 A1 * | 1/2018 | Attard | C02F 1/40 |

FOREIGN PATENT DOCUMENTS

| | | |
|---|---|---|
| WO | 1992020626 | 11/1992 |
| WO | 2006005132 | 1/2006 |

* cited by examiner

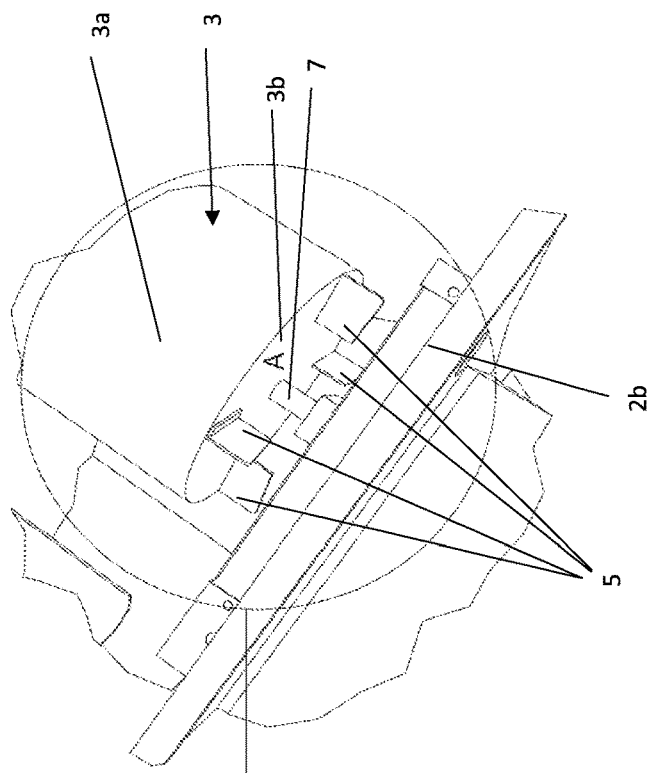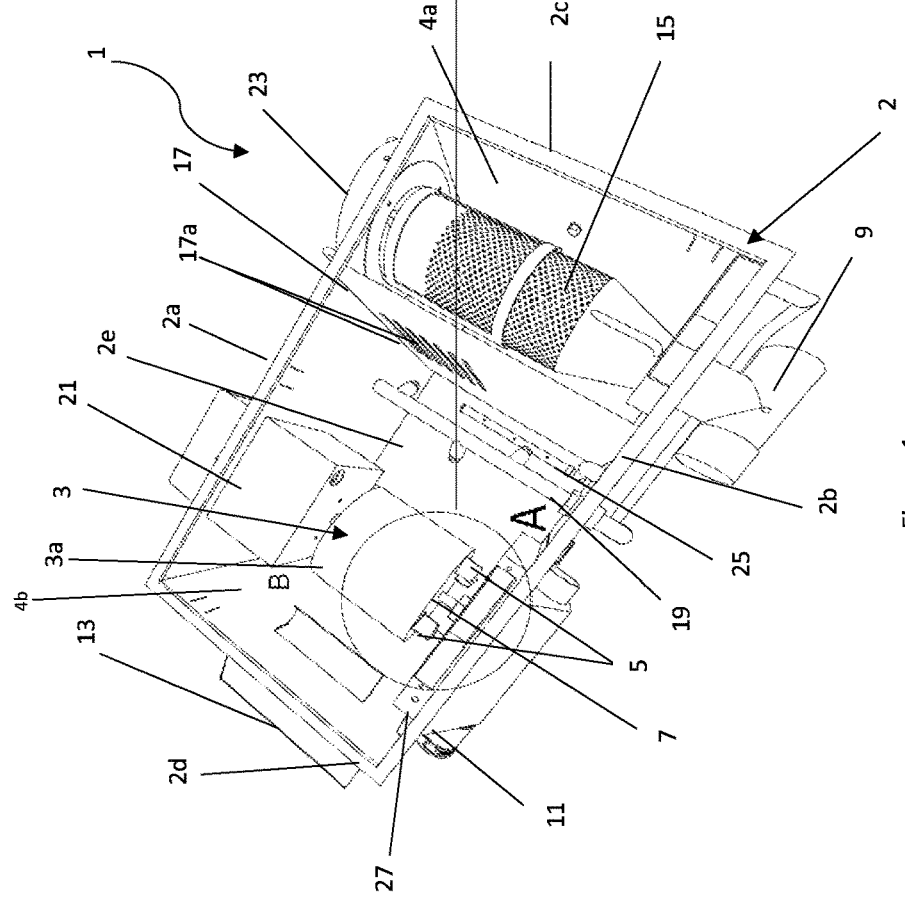

CONTAMINANT RECOVERY DEVICE

CROSS-REFERENCE TO RELATED APPLICATION

The instant application claims priority to United Kingdom Patent Application Serial No. GB1611364.9 filed Jun. 30, 2016, the entire specification of which is expressly incorporated herein by reference.

FIELD OF THE INVENTION

The present invention relates to a contaminant recovery device.

BACKGROUND OF THE INVENTION

Contaminant recovery devices such as grease recovery devices and/or grease traps are widely used in commercial and residential settings to remove contaminants such as fats, oils and grease from a body of water. In a typical arrangement, the contaminant recovery device will have a liquid storage container with an inlet coupled to a sink drain and an outlet coupled to the wastewater outlet pipe for the building and/or setting where the sink is located. Contaminated liquid will enter the liquid storage container via the inlet where it separates from the water and/or liquid and rises to the surface. A baffle arrangement is provided, and the water and/or liquid are able to pass underneath the baffle arrangement and exit the contaminant recovery device via the outlet. The contaminants, which are trapped on the surface of the liquid, are removed using a skimming wheel or drum which will act to lift the contaminants that rest on the surface of the body of liquid upwards so that they can be removed. The cleaned liquid exits the liquid storage container via the outlet. While such contaminant recovery devices have been generally successful at removing contaminants from the body of liquid, the time required to perform a contaminant recovery and/or separation operation is often undesirably long and the overall operation is inefficient.

SUMMARY OF THE INVENTION

It is an object of the present invention to increase the efficiency of a contaminant recovery operation and/or reduce the time required to perform such an operation.

Accordingly, the present invention provides a contaminant recovery device comprising a container sized to hold a body of contaminated liquid; a skimming means adaptable to at least temporarily remove contaminants from the body of contaminated liquid; and means for inducing a flow in at least part of the body of contaminated liquid at or about the skimming means.

Advantageously, the means for inducing a flow in at least part of the body of contaminated liquid at or about the skimming means is able to induce a flow and/or flow change in the body of contaminated liquid around the skimming means. This allows for a greater volume of contaminants to be removed during a skimming operation. In existing systems, the contaminant recovery devices rely upon the natural flow and/or drift of liquid, which is often unpredictable, in a direction away from the skimming means. As such, the amount of contaminants in the vicinity of the skimming means is often limited, and the contaminant recovery operation needs to run for a long time in order for the contaminants to slowly drift towards the skimming means. This is both inefficient, and also increases the energy costs for the end user. The present invention induces a flow in the body of contaminated liquid, and so avoids the need to rely upon the natural flow and/or drift of liquid, thereby reducing running times and improving the contaminant recovery devices skimming efficiency.

Preferably, the skimming means is adaptable to at least temporarily remove contaminants from around the surface of the body of contaminated liquid.

Ideally, the means for inducing a flow in at least part of the body of contaminated liquid comprises means for inducing a flow around the surface of the body of contaminated liquid.

Advantageously, the means for inducing flow is able to induce a flow and/or flow change in the surface of the body of contaminated liquid. Contaminants such as fats, oils and grease will rise to and/or rest on the surface of the body liquid, and the means for inducing a flow is adaptable induce a flow and/or flow change in these contaminants at or about the skimming means.

Ideally, the means for inducing a flow in at least part the body of contaminated liquid comprising means for directing contaminants in the body of contaminated liquid around the skimming means.

Preferably, the skimming means has a contaminant engaging and/or pick-up region.

Ideally, the means for inducing a flow in at least part of the body of contaminated liquid is adaptable to induce a flow in at least part of the body of contaminated liquid towards the contaminant engaging and/or pick-up region of the skimming means.

Advantageously, the means for inducing a flow is adaptable to direct the contaminated liquid towards the contaminant engaging and/or pick-up region of the skimming means so that the contaminants can be engaged with, or picked-up by the skimming means.

Ideally, the contaminant engaging and/or pick-up region is adaptable to enter the body of contaminated liquid at a first location and exit the body of contaminated liquid at a second location, the contaminant engaging and/or pick-up region being adaptable to lift contaminants at or around the second location.

Preferably, the second location being different from the first location.

Advantageously, the contaminant engaging and/or pick-up region is adaptable to lift contaminants from the body of contaminated liquid such that they can be removed.

Ideally, the means for inducing a flow in at least part of the body of contaminated liquid is adaptable to induce a flow in the body of contaminated liquid towards the second location.

Advantageously, the means for inducing a flow is adaptable to direct the contaminated liquid towards the second location where the contaminants are lifted from the body of contaminated liquid. This means that a greater volume of contaminants can be lifted from the body of contaminated liquid during a skimming operation as contaminants are continuously and/or intermittently being directed towards the contaminant engaging and/or pick-up region.

Preferably, the means for inducing a flow comprises means for physically contacting at least part of the body of contaminated liquid in a region at or about the skimming means.

Ideally, the means for physically contacting the body of contaminated liquid are mounted on the skimming means.

Preferably, the means for physically contacting the body of contaminated liquid comprises one or more paddles.

Advantageously, the paddles contact the body of contaminated liquid and push against it to induce the flow.

Ideally, the skimming means is a rotatable skimming means.

Preferably, the rotatable skimming means is rotatable about an axle mounted in the container.

Ideally, the axle extends at least part of the way between opposed walls of the container.

Preferably, the rotatable skimming means comprises at least one contaminant lifting surface.

Ideally, the at least one contaminant lifting surface forms at least part of an outer surface of the rotatable skimming means.

Preferably, the rotatable skimming means comprises a rotatable drum, and wherein the curved outer surface of the drum forms the contaminant lifting surface.

Alternatively, the rotatable skimming means comprising a rotatable skimming wheel or disk.

Ideally, the rotatable drum is a rotatable, cylindrical, drum.

Preferably, the means for physically contacting at least part of the body of contaminated liquid are mounted on at least an end surface of the rotatable drum, wheel and/or disk.

Ideally, the means for physically contacting the body of contaminated liquid comprises one or more paddles, the one or more paddles being locatable on the end surface of the rotatable drum, wheel and/or disk.

Preferably, the means for physically contacting the body of contaminated liquid comprises a plurality of paddles, the plurality of paddles being spaced apart around the circumference of the end surface of the rotatable drum, wheel and/or disk.

Ideally, the plurality of paddles is arranged such that the blades of the paddles extend radially outwards from a central region of the drum towards an edge region of the drum, wheel and/or disk.

Ideally, the plurality of paddles are arranged such that the length component of the blades of the paddles extend radially outwards from a central region of the drum towards an edge region of the drum, wheel and/or disk and the height component of the blades of the paddles extend axially away from the drum, wheel and/or disk and/or the end surface of the drum, wheel and/or disk.

Preferably, the contaminant recovery device further comprises a wiper blade assembly.

Ideally, the contaminant recovery device further comprises a contaminant storage container.

Preferably, the wiper blade assembly is adaptable to skim contaminants from the skimming means and direct them towards the contaminant storage container.

Advantageously, the wiper blade assembly is able to remove contaminants from the skimming means, such that the contaminants can be permanently removed from the body of contaminated liquid.

Ideally, the contaminant storage container being removably attached to an outside surface of a wall of the container.

Ideally, the container sized to hold the body of contaminated liquid comprises a contaminated liquid inlet and a clean liquid outlet.

Preferably, the container sized to hold the body of contaminated liquid comprises a rear wall, front wall and a pair of side walls extending between the rear wall and front wall.

Ideally, the contaminant storage container being removably attached to the outside surface of one of the side walls of the container.

Ideally, the contaminated liquid inlet and clean liquid outlet are positioned in the rear wall of the container.

Preferably, the contaminant recovery device further comprising a filtration means operatively connected to the contaminated liquid inlet, the filtration means being adaptable to remove solids from the contaminated liquid entering the contaminant recovery device.

Ideally, the filtration means comprising a strainer basket.

Preferably, the strainer basket being removable from the contaminant recovery device.

Preferably, the contaminant recovery device further comprising at least one baffle disposed within the container.

Ideally, the at least one baffle comprises an inlet baffle disposed within the container between the filtration means and the skimming means.

Advantageously, the inlet baffle acts to slow the flow of the contaminated liquid down which allows and/or accelerates the separation of the contaminants from the liquid. The inlet baffle further acts to redirect the flow downwards which also assists in the separation process.

Ideally, the inlet baffle comprises one or more holes arranged towards the top of the inlet baffle, the one or more holes being adaptable to allow contaminants that have already separated from the liquid to flow through the inlet baffle. Ideally, the contaminant recovery device comprising a controller for controlling the skimming means.

Preferably, the controller being disposed within a control unit mounted on the container.

Ideally, the control unit being recessed into a wall of the container.

Preferably, the control unit being recessed into the front wall of the container.

Ideally, the contaminant recovery device further comprises a heating element, the heating element being adaptable to heat at least part of the body of contaminated liquid disposed within the container.

Preferably, the contaminant recovery device further comprises a spraying device, the spraying device being adaptable to spray a liquid such as water into the container.

Ideally, the contaminants comprise fats, oils or grease or a combination thereof.

Accordingly, the present invention further provides a method for recovering contaminants from a body of contaminated liquid, the method comprising: skimming at least part of the body of contaminated liquid to at least temporarily remove contaminants from the body of contaminated liquid; and inducing a flow in at least part of the body of contaminated liquid at or about the region where the at least part of the body of contaminated liquid is skimmed.

Ideally, the step of skimming at least part of the body of contaminated liquid is performed by a skimming means.

Preferably, the step of inducing a flow in at least part of the body of contaminated liquid is performed by a means for inducing a flow.

Ideally, the method further comprises heating at least part of the body of contaminated liquid, and preferably the step of heating is performed by a heating element.

The skilled man will appreciate that all preferred or optional features of the invention described with reference to only some aspects or embodiments of the invention may be applied to all aspects of the invention.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

BRIEF DESCRIPTION OF THE DRAWINGS

The invention will now be described with reference to the accompanying drawing which shows by way of example only one embodiment of an apparatus in accordance with the invention.

In the drawings:

FIG. 1 is a perspective view of a contaminant recovery device according to illustrative arrangements of the present invention; and FIG. 2 is a detailed view of region A marked in FIG. 1.

DETAILED DESCRIPTION OF THE INVENTION

In FIG. 1, there is shown a contaminant recovery device indicated generally by the reference numeral 1. The contaminant recovery device 1 shown in FIG. 1 is of a type suitable to be positioned underneath a sink space such that the contaminant recovery device 1 can receive contaminated liquid from the sink drain and recover contaminants such as fats, oils and grease therefrom. The skilled person will appreciate that this one example arrangement of the present invention and the present invention is not limited to this specific embodiment. For example, the contaminant recovery device 1 can also be connected to any of pot wash sinks, pre-rinse sinks, combination ovens, Asian woks, and floor drains.

The contaminant recovery device 1 comprises a container indicated generally by the reference numeral 2 which is sized to retain a body of contaminated liquid. The container 2 of FIG. 1 is a generally rectangular shaped container 2 with a front wall 2a, rear wall 2b, and side walls 2c, 2d extending therebetween. A floor 2e is also provided, and while a lid is not shown in the Figures, it will be appreciated that a lid may be positioned over the container 2. The present invention is not limited to this particular shape and arrangement of container 2, and it will be appreciated that other arrangements of container 2 are within the scope of the present invention.

A skimming device indicated generally by the reference numeral 3 is disposed within the container 2. The skimming device 3 is adapted to at least temporarily remove contaminants from the body of contaminated liquid. In some embodiments of the present invention, the skimming device 3 comprises a contaminant engaging and/or pick-up region 3a for at least temporarily removing contaminants from the body of contaminated liquid. The contaminant engaging and/or pick-up region 3a is adapted to enter the body of contaminated liquid at a first location and exit the body of contaminated liquid at a second location. The contaminant engaging and/or pick-up region 3a is adapted to lift contaminants at or around the second location. The second location is different from the first location. In the embodiment shown in FIG. 1, the skimming device 3 is a rotatable skimming device 3 that is rotatable about an axle 7 mounted in the container 2. The axle 7 is shown extending part of the way between the opposed front 2a and rear 2b walls for the container 2. Equally in some arrangements not shown in the Figures, the axle 7 can extend all of the way between the opposed front 2a and rear 2b walls for the container 2. The rotatable skimming device 3 comprises a contaminant lifting surface 3a which is adaptable to lift contaminants up from the contaminated body of liquid. The contaminant lifting surface 3a forms at least part of the outer surface of the rotatable skimming device 3. In some embodiments as shown in FIG. 1, the rotatable skimming device 3 comprises a rotatable drum 3 or rotatable, cylindrical, drum. The curved outer surface 3a of the skimming drum 3 forms the contaminant lifting surface 3a. It will be appreciated that the present invention is not limited to the specific skimming devices 3 shown in the Figures and as described above. Any skimming device 3 such as a skimming wheel or disk which is able to at least temporarily remove contaminants from the body of contaminated liquid is within the scope of the skimming device 3 of the present invention.

Referring to FIG. 2 in particular, the contaminant recovery device 1 further comprises a device 5 for inducing a flow in at least part of the body of contaminated liquid held within the container 2 at or about the skimming device 3, and can further operate to induce a flow around the surface of the body of contaminated liquid. The device 5 is further able to induce a flow and/or flow change in the surface of the body of contaminated liquid. Contaminants such as fats, oils and grease will rise to and/or rest on the surface of the body liquid, and the device 5 is able to induce a flow and/or flow change in these contaminants at or about the skimming device 3. In some embodiments, the device 5 is arranged to direct contaminants in the body of contaminated liquid around the skimming device 3. Additionally or separately, the device 5 is able to induce a flow in at least part of the body of contaminated liquid towards the contaminant engaging and/or pick-up region 3a of the skimming device 3. In this way, the device 5 is adapted to direct the contaminated liquid towards the contaminant engaging and/or pick-up region 3a of the skimming device 3 so that the contaminants can be engaged with, or picked-up by the skimming device 3.

In some embodiments of the present invention as outlined above, the contaminant engaging and/or pick-up region 3a of the skimming device 3 is adapted to enter the body of contaminated liquid at a first location and exit the body of contaminated liquid at a second location. In these embodiments, the device 5 is adapted to induce a flow in the body of contaminated liquid towards the second location. This means that the device 5 is able to direct the contaminated liquid towards the second location where the contaminants are lifted from the body of contaminated liquid. A greater volume of contaminants can be lifted from the body of contaminated liquid during a skimming operation as contaminants are being directed towards the contaminant engaging and/or pick-up region 3a.

In some embodiments the device 5 comprises a device 5 for physically contacting at least part of the body of contaminated liquid in a region at or about the skimming device 3. The device 5 for physically contacting the body of contaminated liquid is mounted on the skimming device 3. In the particular arrangement shown in FIGS. 1 and 2, the device 5 for physically contacting the body of liquid comprises four paddles 5. The paddles 5 are able to contact the body of contaminated liquid and push against it to induce the flow. The paddles are mounted on the end surface 3b of the rotatable drum 3. The paddles 5 are spaced apart around the end surface of the rotatable drum 3 and are arranged such that the length component of the blades of the paddles 5 extend radially outward from a central region of the drum 3 and towards an edge region of the drum 3 and the height component of the blades of the paddles 5 extend axially away from the end surface 3b of the drum 3. While the Figures show a plurality of paddles 5, it will be appreciated that the use of a single paddle 5 is also within the scope of the present invention.

Referring to FIG. 1, the contaminant recovery device 1 further comprises a contaminant storage container 13 and a wiper blade assembly (not shown). The wiper blade assembly is adapted to skim contaminants from the skimming device 3 and direct them towards the contaminant storage container 13. In this way, the contaminants can be permanently removed from the body of contaminated liquid. The contaminant storage container 13 is removably attached to an outside surface of the side wall 2*d* of the container 2 in the arrangement shown in FIG. 1. Equally the contaminant storage container 13 could be attached to any of the front 2*a*, rear 2*b*, and side 2*c* walls of the container 2.

The contaminant recovery device 1 further comprises a contaminated liquid inlet 9 and a clean liquid outlet 11. The contaminated liquid inlet 9 is able to operatively connect to a contaminated liquid source such as a sink drain. In this way, contaminated liquid can enter the container 2 via the contaminated liquid inlet 9 and at be at least temporarily retained within the container 2. The clean liquid outlet 11 enables liquid with the contaminants removed to exit from the container 2 and is typically operatively connected to a waste water drain. Referring to FIG. 1 in particular, the contaminated liquid inlet 9 and clean liquid outlet 11 are arranged in the rear wall 2*b* of the container 2. This arrangement is advantageous as it means that the pipes (not shown) extending from the inlet 9 and outlet 11 are tucked away at the back of the contaminant recovery device 1, and therefore not easily dislodged or damaged by a user of the sink under which the device 1 is positioned. Of course, the present invention is not limited to this specific arrangement. The inlet 9 and outlet 11 can be arranged in any of the front 2*a*, rear 2*b* and side 2*c*, 2*d* walls of the container 2 and can be both arranged in the same or in different walls.

A filtration device 15 is provided within the container 2 and is operatively connected to the inlet 9. In this way, contaminated liquid will pass through the contaminated liquid inlet 9 and enter into the filtration device 15. The filtration device 15 is a strainer basket 15 with a number of small holes provided therein. The holes in the strainer basket 15 allow the contaminated liquid to escape from the strainer basket 15 and enter the main body of the container 2, but will trap and prevent any large solid matter from entering the container 2. The strainer basket 15 is removable from the front wall 2*a* of the container 2 using a grab handle 23 attached to the strainer basket 15.

Referring to the arrangement shown in FIG. 1, a baffle 17 is disposed within the container 2 and acts to subdivide the main body of the container 2 into a first region 4*a* and a second region 4*b*. The baffle 17 is an inlet baffle 17 disposed between the filtration device 15 and the skimming device 3. The inlet baffle 17 acts to slow the flow of contaminated liquid down which allows and/or accelerates the separation of the contaminants from the liquid. The inlet baffle 17 further acts to redirect the flow downwards which also assists in the separation process. Upon exiting the holes in the strainer basket 15, the contaminated liquid will enter the first region 4*a* of the container 2 and travel under the inlet baffle 17 to reach the second region 4*b*. The inlet baffle 17 also comprises one or a series of holes and/or apertures 17*a* arranged towards the top of the inlet baffle 17, the one or more holes and/or apertures 17*a* allow contaminants that have already separated from the liquid to flow through the inlet baffle 17.

The skimming device 3 for at least temporarily removing contaminants in the body of contaminated liquid is disposed within the second region 4*b*.

A controller 21 for controlling at least the skimming device 3 of the contaminant recovery device 1 is provided disposed within a control unit 21 mounted on the container 2. The control unit 21 is recessed into the front wall 2*a* of the container 2 and is operatively connected to the skimming drum 3. In the particular arrangement shown in FIG. 1, the axle 7 of the rotatable skimming drum 3 extends into the control unit 21. The control unit 21 is able to drive the axle 7 to cause the skimming drum 3 to rotate.

Referring to FIG. 1, the contaminant recovery device 1 further comprises a heating element 25 disposed within the container 2. The heat element 25 is adapted to heat the body of contaminated liquid disposed within the container 2 to cause the contaminants such as fats, oils and grease to liquefy. In this way, the contaminants are more easily removed by the skimming device 3. In addition or separately, a spraying device 19 may also be disposed within the container 2. The spraying device 19 is adapted to spray a liquid such as water into the container 2 to clean and/or dislodge contaminants from any of the strainer basket 15, baffle 17, outlet baffle 27, and skimming device 3. In addition, the spraying device 19 is adapted to break up surface scum that may form over time in the contaminant recovery device 1. Breaking up the surface scum allows for a more efficient skimming operation.

Use of the contaminant recovery device 1 as referred to above will now be described in reference to the example where the device 1 is used within a kitchen setting.

Initially, contaminated liquid such as wastewater from a kitchen sink is directed through the inlet 9 of the device 1 and into the filtration device and/or strainer basket 15. Solid debris in the contaminated liquid is trapped in the strainer basket 15 which can be removed and emptied and/or cleaned. The contaminated liquid then enters the region 4*a* in the main body of the container 2 where it is retained. The inlet baffle 17 acts to slow the flow of the contaminated liquid and directs the flow underneath the inlet baffle 17. At this stage, the contaminants (e.g., fats, oils and grease) have mainly not separated from the liquid and so will also pass underneath the inlet baffle 17. Any contaminants that have already separated, however, will pass through the apertures and/or holes 17*a* and also enter the region 4*b* in the main body of the container. In region 4*b* the contaminants (e.g., fats, oils and grease) and the clean liquid (e.g., water) will naturally separate as the contaminants will rise to the surface of the liquid. The clean liquid is able to pass underneath an outlet baffle 27 arranged towards the clean water outlet 11 of the contaminant recovery device 1 and into a wastewater drain. The "lighter" contaminants rest on the surface of the liquid and are unable to pass underneath the outlet baffle 27. The baffle arrangements are a conventional part of grease traps and/or recovery devices and will not be discussed in detail. The contaminants are retained within the container 2 and are removed through a periodic system of heating and skimming.

In particular, the heating element 25 will be activated to liquefy the contaminants, and the skimming device 3 will act to at least temporarily remove the liquefied contaminants. The device 5 for inducing a flow is able to induce a flow in at least part of the contaminated body of the liquid at or about the skimming device 3. In this way, a flow is able to be induced into the otherwise stagnant or slow moving contaminated body of liquid such that the contaminants are removed by the skimming device 3 at a faster rate. The contaminants removed by the skimming device 3 are then collected in the contaminant storage container 13.

In the particular arrangement shown in the Figures, as the drum 3 rotates the blades of the paddles 5 will enter and/or exit the body of contaminated liquid in a form of paddling motion. The paddling motion creates and/or changes the flow at or about the drum 3. The paddles 5 being arranged on the drum 3 such they are spaced apart around the end portion 3*b* of the drum and that the length component of the blades of the paddles 5 extends radially outward from a central region of the drum 3 and towards an edge region of the drum 3 and the height component of the blades of the paddles 5 extend axially away from the end surface 3*b* of the drum 3 helps direct the flow around the drum 3. In typical expected operations, the heating and skimming operations will only be performed during a short period around 2-3 hours per day. In the meantime, the contaminant recovery device will be operable to retain contaminants and allow clean water to pass through the outlet 11. This arrangement conserves energy as continual heating of the body of contaminated liquid is not required.

In the preceding discussion of the invention, unless stated to the contrary, the disclosure of alternative values for the upper or lower limit of the permitted range of a parameter, coupled with an indication that one of the said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

What is claimed is:

1. A contaminant recovery device, comprising:
   a container sized to hold a body of contaminated liquid;
   a rotatable skimming means adaptable to at least temporarily remove contaminants from the body of contaminated liquid;
   a wiper blade assembly adaptable to skim contaminants from the rotatable skimming means; and
   means for inducing a flow in at least part of the body of contaminated liquid at or about the rotatable skimming means;
   wherein the means for inducing a flow comprises means for physically contacting at least part of the body of contaminated liquid in a region at or about the skimming means, the means for physically contacting the body of contaminated liquid being mounted on the skimming means.

2. The contaminant recovery device as claimed in claim 1, wherein the skimming means is adaptable to at least temporarily remove contaminants from around a surface of the body of contaminated liquid.

3. The contaminant recovery device as claimed in claim 1, wherein the skimming means has a contaminant engaging or pick-up region.

4. The contaminant recovery device as claimed in claim 3, wherein the means for inducing a flow in at least part of the body of contaminated liquid is adaptable to induce a flow in at least part of the body of contaminated liquid towards the contaminant engaging or pick-up region of the skimming means.

5. The contaminant recovery device as claimed in claim 3, wherein the contaminant engaging or pick-up region is adaptable to enter the body of contaminated liquid at a first location and exit the body of contaminated liquid at a second location, the contaminant engaging or pick-up region being adaptable to lift contaminants at or around the second location.

6. The contaminant recovery device as claimed in claim 5, wherein the second location is different from the first location.

7. The contaminant recovery device as claimed in claim 5, wherein the means for inducing a flow in at least part of the body of contaminated liquid is adaptable to induce a flow in the body of contaminated liquid towards the second location.

8. The contaminant recovery device as claimed in claim 1, wherein the means for physically contacting the body of contaminated liquid comprises one or more paddles.

9. The contaminant recovery device as claimed in claim 1, wherein the rotatable skimming means comprises at least one contaminant lifting surface, wherein the at least one contaminant lifting surface forms at least part of an outer surface of the rotatable skimming means.

10. The contaminant recovery device as claimed in claim 1, wherein the rotatable skimming means comprises a rotatable drum, rotatable skimming wheel or disk.

11. The contaminant recovery device as claimed in claim 10, wherein the means for physically contacting at least part of the body of contaminated liquid are mounted on at least an end surface of the rotatable drum, rotatable skimming wheel or disk.

12. The contaminant recovery device as claimed in claim 11, wherein the one or more paddles is locatable on the end surface of the rotatable drum, rotatable skimming wheel or disk.

13. The contaminant recovery device as claimed in claim 12, wherein the plurality of paddles is spaced apart around a circumference of the end surface of the rotatable drum, rotatable skimming wheel or disk.

14. The contaminant recovery device as claimed in claim 13, wherein the plurality of paddles are arranged such that blades of the paddles extend radially outwards from a central region of the drum towards an edge region of the rotatable drum, rotatable skimming wheel or disk.

15. The contaminant recovery device as claimed in claim 14, wherein the plurality of paddles are arranged such that the length component of the blades of the paddles extend radially outwards from a central region of the drum towards an edge region of the drum and the height component of the blades of the paddles extend axially away from the drum.

16. The contaminant recovery device as claimed in claim 1, wherein the rotatable skimming means is rotatable about an axle mounted in the container.

17. The contaminant recovery device as claimed in claim 1, further comprising a contaminant storage container.

18. The contaminant recovery device as claimed in claim 1, wherein the container sized to hold the body of contaminated liquid comprises a rear wall, front wall and a pair of side walls extending between the rear wall and front wall, the container further comprising a contaminated liquid inlet and a clean liquid outlet, wherein the contaminated liquid inlet and clean liquid outlet are positioned in the rear wall of the container.

19. The contaminant recovery device as claimed in claim 18, further comprising a filtration means operatively connected to the contaminated liquid inlet, the filtration means being adaptable to remove solids from the contaminated liquid entering the contaminant recovery device.

20. The contaminant recovery device as claimed in claim 1, further comprising at least one baffle disposed within the container.

\* \* \* \* \*